A. D. SWEET.
SHEARS ATTACHMENT.
APPLICATION FILED AUG. 17, 1915.
1,223,640. Patented Apr. 24, 1917.
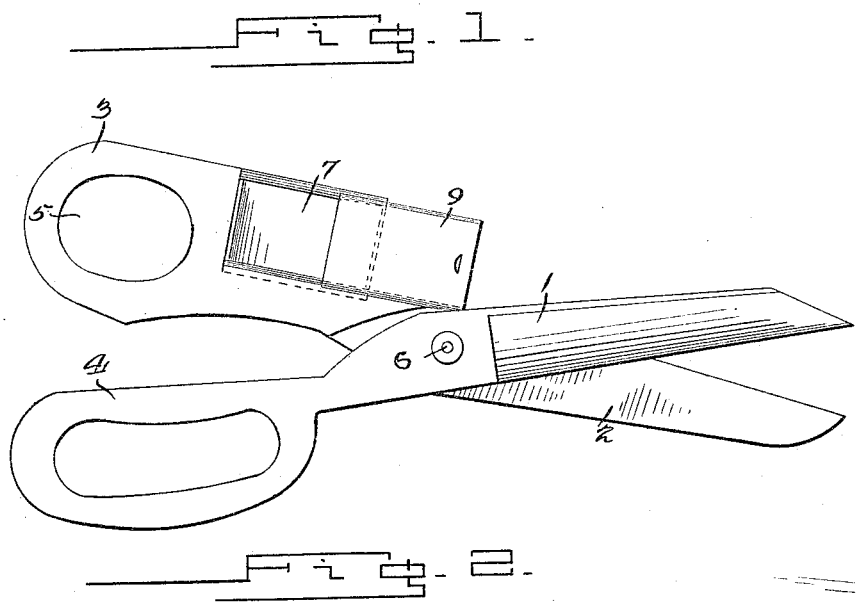
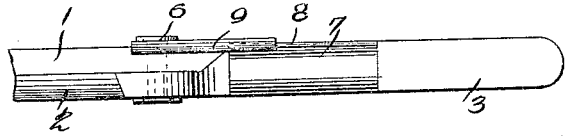
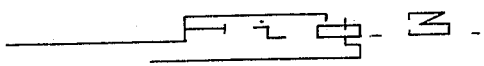
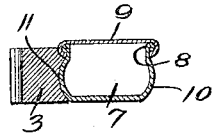
Inventor
Archer D. Sweet
Witnesses
Francis Reilly
F. D. O'Connell
By Richard B. Owen
Attorney

UNITED STATES PATENT OFFICE.

ARCHER DUANE SWEET, OF SCRANTON, PENNSYLVANIA.

SHEARS ATTACHMENT.

1,223,640.   Specification of Letters Patent.   Patented Apr. 24, 1917.

Application filed August 17, 1915. Serial No. 45,966.

*To all whom it may concern:*

Be it known that I, ARCHER D. SWEET, a citizen of the United States, residing at Scranton, in the county of Lackawanna and State of Pennsylvania, have invented certain new and useful Improvements in Shears Attachments, of which the following is a specification.

This invention relates to scissors, shears and the like, and aims to provide an attachment therefor by means of which pins, needles and other accessories may be conveniently carried and kept at hand for immediate use, whenever required.

One of the objects of the invention is to provide an attachment of this character in the form of a receptacle which is embodied in the handle structure of the implement in a novel manner.

A further object of the invention is to so provide receptacle means of this character with a sliding closure operable in the direction of the cutting blades of the device and to so position the receptacle means with respect to such blades that the path taken by said closure means is constantly traversed by one of such cutting elements while the device is being used.

Other objects as well as the nature, characteristic features and scope of this invention will be more readily understood from the foregoing description, when taken in connection with the accompanying drawings and pointed out in the claims forming a part of this specification, and wherein:—

Figure 1 is a view in side elevation of a pair of shears constructed in accordance with my invention and illustrating the application of the same, Fig. 2 is a top view of the handle portion of the shears having my invention attached thereto, the cover of the receptacle being shown drawn partly forward.

Fig. 3 is a cross sectional view taken through the receptacle and handle portion of the shears.

Referring to the drawings, a pair of shear-blades 1 and 2 are shown provided with thumb and finger grips 3 and 4 respectively. The finger grip 4 is of the usual construction but the thumb grip 3 in the present instance is constructed of a width somewhat greater than usual to permit of a portion thereof being cut away, intermediate the thumb hole 5 and the pivot 6, to provide for the proper reception of the receptacle means 7.

The receptacle means comprises a small metallic box which may be stamped or formed of one piece of material, the lateral marginal edges 8 of which, are rolled over so as to provide beads for sliding engagement with a cover 9. The sides of the receptacle bulge outwardly as indicated at 10 and when fitted to the cut-out portion of the thumb grip 3, one of the bulging sides is received into a complemental groove 11 formed in the handle 3 as shown to advantage in Fig. 3 of the drawings. Any suitable medium may be employed for welding the receptacle to the shears and when in proper position, the receptacle should lie in a level plane with the handle 3 so as to be, substantially, an integral part therewith. When thus secured, the receptacle, as will be seen, is positioned between the thumb hole 5 and the pivot 6 of the cutting blades, with the cover receiving end in proximity to the latter.

The receptacle opens upon what may properly be called the upper face of the handle 3, since it is usual for scissors or shears to assume a certain position upon being released from the hand. The position thus assumed by a scissors or the like when laid aside, is illustrated in Fig. 1 of the drawing, as viewed from above, and consequently by the arrangement of the receptacle 7 in the manner described, the opened end thereof will always face upwardly whenever the scissors is properly at rest and access can readily be had thereto.

The cover 9 which is preferably formed of a single sheet of material is adapted to be slidably associated with the receptacle 7 and has its longitudinal edges turned under for engagement with the beads 8, upon which it is slid back and forth to open or close the receptacle. When access is desired to the receptacle for the purpose of replenishing the supply of pins, needles, etc., carried therein or for removing some of them, the cover 9 is slidably disposed in the direction of the working end of the device, for opening the receptacle to the desired extent, as shown to advantage in Fig. 1 of the drawings. However, it is to be particularly noted that every movement of the cover in this direction tends to bring the same over and upon the upper edge of one of the cutting elements of the implement, such as 1, which in its normal operative movement is adapted to constantly traverse the path thus taken by the cover 9 in the outward opening movement. When extended, the cover 9 thus tends to limit the operative movement of the blade 1 and consequently the latter's usefulness is thereby confined to a restricted area, dependent upon the point of abutment between the scissor blade and the receptacle cover.

The satisfactory operation of the device is therefore prohibited so long as the cover of the receptacle is partially withdrawn or extended therefrom and this is especially desirable in view of the fact that it prevents the receptacle from becoming accidentally opened and the contents discharged therefrom during the use and operation of the implement. The attention of the operator would be promptly called to the fact that the cover of the receptacle was working loose by reason of the contact between cover and blade as previously described. It will be further noted that the cover 9 is slid in a direction counter to the handle 3 so that when access is desired to the receptacle 7, the user will not be required to remove his thumb from the opening 5.

Although the above is a description of the preferred application of my invention, it is to be understood that the receptacle 7 may also be applied to scissors of various types and in many instances it will be unnecessary that the thumb grips or handles of the device be cut-out to provide for the reception of the receptacle, since the same may be soldered, welded or otherwise secured direct to the handle of the scissors.

From the foregoing description taken in connection with the foregoing drawings, it is thought that the construction and operation of the device will be clearly understood and while I have herein shown and described one form of the invention, I do not wish to be limited thereto, except for such limitations as the claims may import.

Having thus fully described my invention what I claim as new and desire to secure by Letters Patent is:—

1. The combination with a pair of cutting blades having handles and pivoted face to face, of a receptacle means positioned on one of the handles and in proximity to the pivot point of the blades, a cover means provided for said receptacle and slidable in the direction of the blade of the opposed handle, said blade adapted when opened to traverse the path of said cover and to limit the outward movement thereof.

2. The combination with a pair of cutting blades pivoted face to face and having handles, one of which is provided with a cut-out portion of right-angular configurations of a receptacle seated in said cut-out portion and having a bulging side adapted to fit into a corresponding groove formed in the cut-out portion, and a cover slidably associated with said receptacle and movable in the direction of the cutting blades, one of said blades adapted when open to traverse the path of said cover and to limit the outward movement thereof, whereby said receptacle is prevented from becoming uncovered during the operation or use of the device.

3. A pair of shears having one of the handles of the cutting blades provided with a cut-out portion, a receptacle accommodated in said cut-out portion and open laterally of the said handle, cover means arranged over said lateral opening and slidable in the direction of said cutting blades, said cover adapted in its various extended positions to abut against one of the cutting blades to limit the extent of separation of said cutting blades.

4. The combination with a pair of cutting blades pivoted face to face and having handles, of a receptacle, one of said handles being provided with a cut-out portion of right angular configuration to accommodate said receptacle, the lower edge of the cut-out portion having a longitudinal groove provided therein to receive a correspondingly bulged side of the receptacle, said receptacle opening laterally of the inner face of its supporting handle and having its marginal edge rolled to provide beads, the inner one of which is spaced from the adjacent edge of the supporting handle and a cover having turned-under edges for engagement with the beads of the receptacle, said cover being slidably disposed in the direction of the cutting blades and adapted, when extended, to limit the extent of separation of said blades.

In testimony whereof I affix my signature in presence of two witnesses.

ARCHER DUANE SWEET.

Witnesses:
JAMES PROTHERA,
MADYEN SHOTTO.

Copies of this patent may be obtained for five cents each, by addressing the "Commissioner of Patents, Washington, D. C."